(No Model.)
J. MITCHELL.
SHOE COUNTER.
No. 600,316. Patented Mar. 8, 1898.
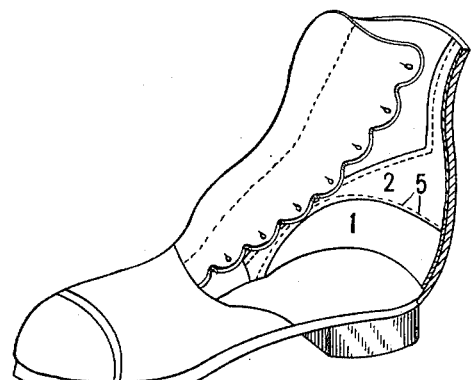
Fig. 1
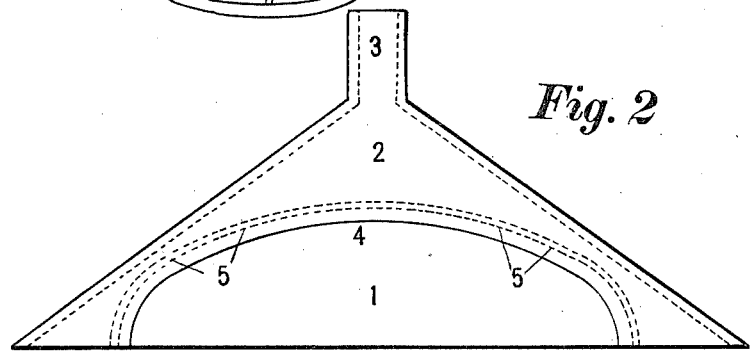
Fig. 2
Fig. 3
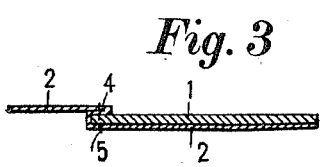
Fig. 4
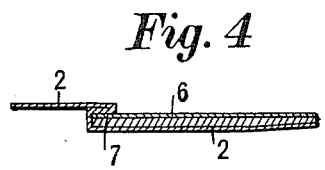
Fig. 5
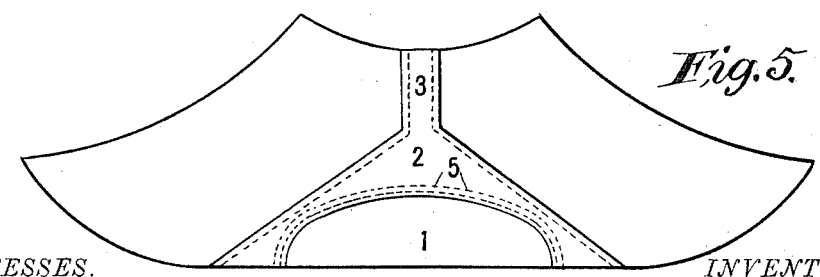
WITNESSES.
Frank S. Wheeler
INVENTOR.
Jacob Mitchell,
By H. Roscoe Wheeler
Attorney.

UNITED STATES PATENT OFFICE.

JACOB MITCHELL, OF DETROIT, MICHIGAN.

SHOE-COUNTER.

SPECIFICATION forming part of Letters Patent No. 600,316, dated March 8, 1898.

Application filed April 8, 1897. Serial No. 631,261. (No model.)

*To all whom it may concern:*

Be it known that I, JACOB MITCHELL, a citizen of the United States, residing at Detroit, in the county of Wayne and State of Michigan, have invented certain new and useful Improvements in Shoe-Counters; and I do hereby declare the following to be a full, clear, and exact description of the invention, such as will enable others skilled in the art to which it appertains to make and use the same, reference being had to the accompanying drawings, forming a part of this specification.

This invention relates to new and useful improvements in shoe-counters; and it consists in the construction and arrangement of parts, as hereinafter fully set forth, and pointed out particularly in the claims.

The object of the invention is to provide a shoe with a counter or stiffener for the heel, which is placed on the outside of the lining, so that said counter is exposed to and comes directly in contact with the stocking or heel of the wearer, some of the advantages of which construction will be hereinafter referred to, which object is attained by the construction illustrated in the accompanying drawings, in which—

Figure 1 is a general perspective view of a shoe, a portion of the same being broken away to more clearly show the location of my improved counter therein. Fig. 2 is a plan view of the counter and its casing. Fig. 3 is a cross-section of a portion of Fig. 2. Fig. 4 represents a cross-section of a modified form of counter. Fig. 5 is a plan view of a counter and casing united with the lining of a shoe.

Referring to the numerals of reference, 1 designates the counter, which is preferably of a semi-oval form and composed of stiff material, as sole-leather, paper, and composition materials.

2 represents the casing for the counter, which may be of any suitable form, preferably that of a triangle, with a strap 3, of any desirable length, extending from its upper end or apex, said casing being composed of leather, canvas, or other similar fabric.

In the manufacture of the counter and its casing said casing is laid upon a flat surface and the counter placed thereon, so that its long straight edge will lie flush with the longest edge of the casing, and if desired to make it firmly adhere thereto glue or cement may be interposed therebetween. The casing is then gathered up around the curved edge of the counter, folded thereover, as shown at 4, and stitched thereto, as shown at the dotted line 5 in Figs. 1 and 2.

In the manufacture of shoes, slippers, boots, or other wearing-apparel of similar nature it is intended that this casing and counter shall be sewed to the lining thereof, as shown in Fig. 5, before said lining is attached to the upper.

Should it be desired to place a softer fabric, as felt or flannel 6, over the counter to assist in retaining heat within the shoe, said fabric may be cut to correspond with the size and formation of the counter and placed adjacent thereto, so that the casing may be folded thereover, as shown at 7 in Fig. 4, and, if desired, said fabric 6 may be glued or cemented thereto.

It will thus be seen that by the construction and arrangement of parts hereinbefore set forth a shoe-counter is produced that will occasion very little wear on the stocking, for it will be understood that sole-leather and paper are susceptible of a high polish or finish, whereby friction is reduced to a minimum. It will also be seen that as the lining at the heel is protected the shoe will last considerably longer than as ordinarily constructed, for when the lining is gone the leather is brought in contact with the stocking or foot, and as it absorbs moisture therefrom its stability is destroyed and is soon rendered worthless.

Having thus fully set forth my invention, what I claim as new, and desire to secure by Letters Patent, is—

1. A counter for boots and shoes, the same consisting of a casing composed of leather or fabric triangular in contour, a stiffener semi-oval in formation, the curved edge of said stiffener embraced by the fold of said casing intermediate of the sides thereof, said casing and stiffener united, stitched fast through the fold of said casing adjacent to the edge of said stiffener, substantially as shown and described.

2. A counter for shoes, the same consisting of a casing composed of suitable fabric, having a fold therein intermediate of its sides, a stiffener and covering placed upon said casing and beneath said fold and secured thereto by stitching, and said casing adapted to be united with the lining of a shoe for the purpose set forth.

In testimony whereof I affix my signature in presence of two witnesses.

JACOB MITCHELL.

Witnesses:
H. ROSCOE WHEELER,
FRANK S. WHEELER.